(12) United States Patent
Oguri et al.

(10) Patent No.: US 7,516,160 B2
(45) Date of Patent: Apr. 7, 2009

(54) DATA MANAGEMENT SYSTEM AND IMAGE FORMING APPARATUS

(75) Inventors: Satoshi Oguri, Osaka (JP); Toshinobu Yoshida, Osaka (JP); Manami Kawamoto, Osaka (JP); Kenichi Mizusu, Osaka (JP)

(73) Assignee: Kyocera Mita Corporation (JP)

( * ) Notice: Subject to any disclaimer, the term of this patent is extended or adjusted under 35 U.S.C. 154(b) by 288 days.

(21) Appl. No.: 11/288,476

(22) Filed: Nov. 29, 2005

(65) Prior Publication Data

US 2006/0114503 A1 Jun. 1, 2006

(30) Foreign Application Priority Data

Nov. 30, 2004 (JP) ............................. 2004-345968

(51) Int. Cl.
*G06F 7/00* (2006.01)
*G06F 17/00* (2006.01)
(52) U.S. Cl. .................. 707/104.1; 707/10; 711/100; 715/233; 715/838
(58) Field of Classification Search ............... 707/1–10, 707/100–104.1, 200–206; 711/100; 715/233, 715/838
See application file for complete search history.

(56) References Cited

U.S. PATENT DOCUMENTS 7,024,463 B1 4/2006 Hitomi et al.

FOREIGN PATENT DOCUMENTS

| JP | 7-85239 | 3/1995 |
| JP | 07085239 | * 3/1995 |
| JP | 2004-15629 | 1/2004 |

OTHER PUBLICATIONS

Broner et al., Experiences with IFS: a distributed image filing system, Oct. 14-17, 1991, IEEE, 599-610.*
Arndt, T., A survey of recent research in image database management, Oct. 4-6, 1990, IEEE, 92-97.*

* cited by examiner

*Primary Examiner*—Jean B Fleurantin
(74) *Attorney, Agent, or Firm*—Gerald E. Hespos; Anthony J. Casella

(57) ABSTRACT

A data management system is provided for managing data stored in a plurality of image forming apparatuses. In the data management system, a network communication section of a first complex machine requests a second complex machine to transmit attribute information indicative of data stored on a HDD of the second machine, and storage location information for specifying the second machine and for specifying a storage location of the data in the HDD. A network communication section of the second machine responds to the request by transmitting the attribute information and the storage location information thereof to the first machine. The network communication section of the first machine receives the information transmitted from the second machine. A table-data creation section of the first machine then creates table data for correlating information received by the network communication section thereof and stores the created table data on a HDD thereof.

4 Claims, 5 Drawing Sheets

DATA MANAGEMENT SYSTEM AND IMAGE FORMING APPARATUS

BACKGROUND OF THE INVENTION

1. Field of the Invention

The present invention relates to a data management system comprising a plurality of image forming apparatuses connected to each other via a network, and an image forming apparatus connected to another image forming apparatus via a network.

2. Description of the Related Art

Heretofore, there has been known an image forming apparatus designed to perform the steps of: reading image data using an image reading section, such as a scanner; storing the image data on a mass storage medium, such as a hard disk drive, in the form of a document; allowing at least one of a document code of a target document, a document creation date of the target document and targeted keywords to be entered so as to define the scope of retrieval; retrieving documents stored on the mass storage medium based on the entered scope of retrieval; and selectively displaying only a retrieved document (see, for example, Japanese Patent Laid-Open Publication No. 07-085239).

This image forming apparatus is intended to retrieve data stored only on its own mass storage medium, but not intended to retrieve entire data of a system comprising a plural number of the image forming apparatuses connected to each other via a network, such as LAN (Local Area Network).

SUMMARY OF THE INVENTION

In view of the above circumstance, it is an object of the present invention to provide a data management system capable of managing in an integrated manner data stored in a plurality of image forming apparatuses, and an image forming apparatus compatible with the data management system.

In order to achieve the above object, the present invention provides a data management system comprising a plurality of image forming apparatuses connected to each other via a network. Each of the plurality of image forming apparatuses includes data storage means for storing data thereon, and communication means for transmitting and receiving data. In the data management system, the communication means of a certain one of the plurality of image forming apparatuses is operable to make a request to a remaining one or more of the plurality of image forming apparatuses for transmission of attribute information indicative of a content of data stored on the data storage means thereof, and storage location information for specifying which of the plurality of image forming apparatuses has the data storage means storing the data thereon and for specifying a storage location of the data in the data storage means, and the communication means of each of the remaining image forming apparatuses is operable to receive the request from the certain image forming apparatus, and then transmit the attribute information and the storage location information thereof to the certain image forming apparatus. Then, the communication means of the certain image forming apparatus is operable to receive the attribute information and the storage location information transmitted from each of the remaining image forming apparatuses. Further, the certain image forming apparatus includes table-data creation means for creating table data in which the attribute information and the storage location information transmitted from each of the remaining image forming apparatuses are correlated with one another, and table-data storage means for storing thereon the table data created by the table-data creation means.

In the data management system of the present invention, the communication means of the certain one of the plurality of image forming apparatuses connected to each other via the network makes a request to each of the remaining image forming apparatuses for transmission of attribute information indicative of a content of data stored on the data storage means thereof, and storage location information for specifying which of the plurality of image forming apparatuses has the data storage means storing the data thereon and for specifying a storage location of the data in the data storage means. Then, the communication means of each of the remaining image forming apparatuses receives the request from the certain image forming apparatus and transmits the requested attribute information and storage location information to the certain image forming apparatus. The communication means of the certain image forming apparatus receives the attribute information and the storage location information transmitted from each of the remaining image forming apparatuses. Then, the table-data creation means creates table data in which the attribute information and the storage location information transmitted from each of the remaining image forming apparatuses are correlated with one another, and the table-data storage means stores the table data created by the table-data creation means.

In this manner, the attribute information indicative of a content of data stored on the data storage means of each of the image forming apparatuses connected to the network, and the storage location of the data in the data storage means, are stored in the form of the table data. This makes it possible to manage in an integrated manner data stored in a plurality of image forming apparatuses. In addition, information to be provided to a user can be virtually formed as a single information source without the need for designating which of the plurality of image forming apparatuses has the data storage means storing intended data thereon.

The present invention further provides an image forming apparatus for use in such a manner that a plural number of the image forming apparatuses are connected to each other via a network. The image forming apparatus comprises data storage means for storing data thereon, transmission means for transmitting to a remaining one or more of the plurality of image forming apparatuses attribute information indicative of a content of data stored on the data storage means, and storage location information for specifying which of the plurality of image forming apparatuses has the data storage means storing the data thereon and for specifying a storage location of the data in the data storage means, receiving means for receiving the attribute information and the storage location information transmitted from each of the remaining image forming apparatuses, table-data creation means for creating table data in which the attribute information and the storage location information received by the receiving means are correlated with one another, and table-data storage means for storing thereon the table data created by the table-data creation means.

In the image forming apparatus of the present invention, the data storage means stores data thereon, and the transmission means transmits to each of the remaining image forming apparatuses attribute information indicative of a content of data stored on the data storage means, and storage location information for specifying which of the plurality of image forming apparatuses has the data storage means storing the data thereon and for specifying a storage location of the data in the data storage means. Further, the receiving means receives the attribute information and the storage location information transmitted from each of the remaining image forming apparatuses. Then, the table-data creation means creates table data in which the attribute information and the storage location information received by the receiving means are correlated with one another, and the table-data storage means stores thereon the table data created by the table-data creation means.

In this manner, the attribute information indicative of a content of data stored on the data storage means of each of the image forming apparatuses connected to the network, and the storage location of the data in the data storage means, are stored in the form of the table data. This makes it possible to manage in an integrated manner data stored in a plurality of image forming apparatuses. In addition, information to be provided to a user can be virtually formed as a single information source without the need for designating which of the plurality of image forming apparatuses has the data storage means storing intended data thereon.

DETAILED DESCRIPTION OF THE PREFERRED EMBODIMENTS

With reference to the accompanying drawings, an embodiment of the present invention will now be described. It is to be understood that the following embodiments will be shown and described as illustrative examples of the present invention, and they are not intended to limit the present invention to these embodiments.

Figure 1:
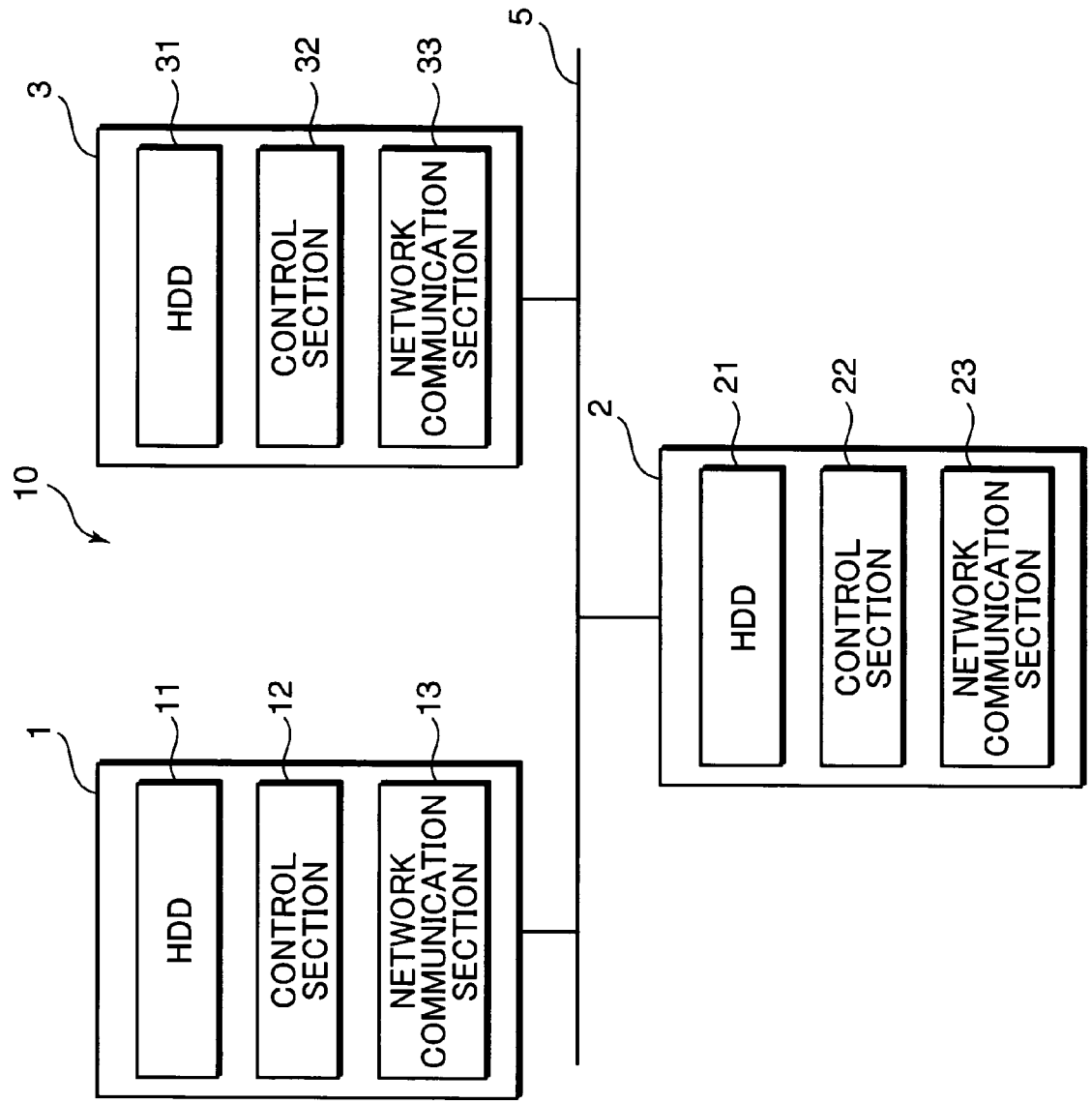
FIG. 1 is a block diagram showing the configuration of a data management system according to one embodiment of the present invention.

FIG. 1 is a block diagram showing the configuration of a data management system according to one embodiment of the present invention. The data management system 10 illustrated in FIG. 1 comprises a first complex machine 1, a second complex machine 2 and a third complex machine 3. The first, second and third complex machines 1, 2, 3 are communicatably connected to each other via a LAN (Local Area Network) 5. Each of the complex machines 1, 2, 3 is a copy machine having composite functions, such as a scanner function, a facsimile function, a printer function and a copying function. In each of the complex machines 1, 2, 3, two or more of the functions can be freely combined with each other to achieve a variety of functions. While the data management system 10 according to this embodiment is composed of the three complex machines 1, 2, 3 connected to each other via the LAN 5, the present invention is not limited to this configuration, but may be composed of at least two complex machines connected to one another via a network, for example two complex machines or four complex machines or more.

Each of the complex machines 1, 2, 3 includes a HDD (Hard Disk Drive) (11, 21, 31), a control section (12, 22, 32), and a network communication section (13, 23, 33). Each of the HDDs 11, 21, 31 as one example of data storage means operates to store data thereon. Each of the control sections 12, 22, 32 operates to monitor and generally control a corresponding one of the complex machines 1, 2, 3, and each of the network communication sections 13, 23, 33 operates to transmit and receive data to/from the other complex machine via the LAN 5.

Figure 2:
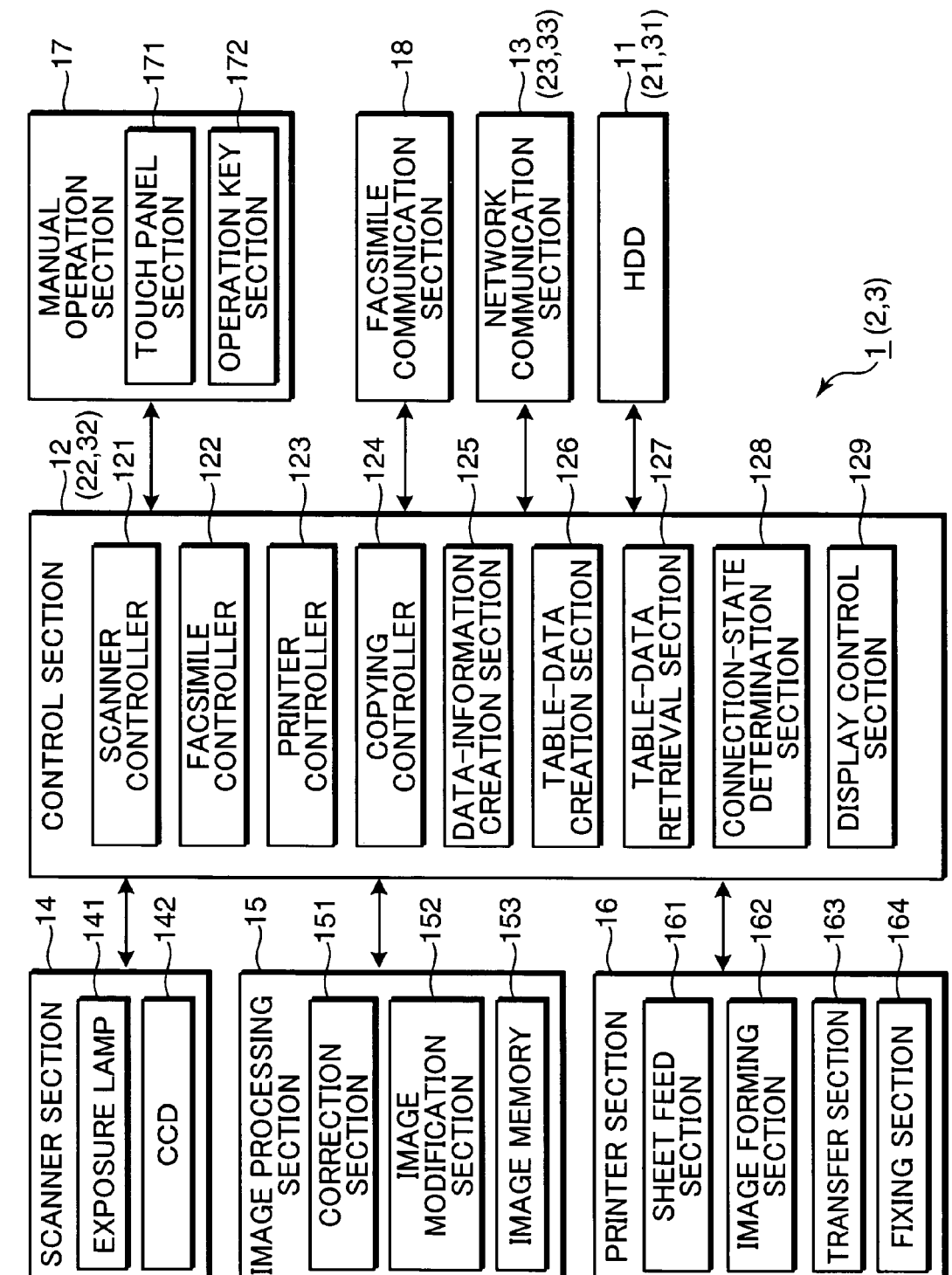
FIG. 2 is a block diagram schematically showing an internal configuration of a first complex machine as one example of an image forming apparatus according to one embodiment of the present invention.

The configuration of each of the complex machines will be described in more detail below. FIG. 2 is a block diagram schematically showing an internal configuration of the first complex machine as one example of an image forming apparatus according to one embodiment of the present invention. While FIG. 2 shows only the configuration of the first complex machine 1, each of the remaining complex machines or the second and third complex machines 2, 3 has the same configuration as that of the first complex machine 1.

The first complex machine 1 comprises the HDD 11, the control section 12, a scanner section 14, an image processing section 15, a printer section 16, a manual operation section 17, a facsimile communication section 18, and the network communication section 13.

In this embodiment, a scanner function is achieved by a combination of the HDD 11, the control section 12, the scanner section 14, the image processing section 15 and the manual operation section 17. A facsimile function is achieved by a combination of the HDD 11, the control section 12, the scanner section 14, the image processing section 15, the printer section 16, the manual operation section 17 and the facsimile communication section 18. A printer function is achieved by a combination of the HDD 11, the control section 12, the image processing section 15, the printer section 16 and the network communication section 13. Further, a copying function is achieved by a combination of the HDD 11, the control section 12, the scanner section 14, the image processing section 15, the printer section 16 and the manual operation section 17.

The manual operation section 17 includes a touch panel section 171 comprising a touch panel, and an operation key section 172 comprising a start key and a plurality of numeric keys. The manual operation section 17 is used when a user performs an operation for the scanner function, the facsimile function, the printer function, the copying function or other function. Specifically, the manual operation section 17 is operable to send an operation command manually entered by the user to the control section 12. The touch panel section 171 comprises a touch panel unit formed, for example, by combining a touch panel and a LCD (Liquid Crystal Display). The touch panel section 171 is operable to display various operation screens, for example, information about a document size, a copy size, the number of copies, etc., during execution of the coping function. Further, the touch panel section 171 is operable, in response to a user's touch thereon, to display a plurality of operation buttons for entering various operation commands therethrough. The operation key section 172 is used when the user enters a scanning execution command, a copying execution command, etc.

The control section 12 serves as a scanner controller 121, a facsimile controller 122, a printer controller 123, a copying controller 124, a data-information creation section 125, a table-data creation section 126, a table-data retrieval section 127, a connection-state determination section 128, and a display control section 129. The control section 12 comprises a microcomputer and a dedicated hardware circuit, and operates to control various operations of the entire machine. The scanner controller 121 operates to control each operation of the sections for achieving the scanner function. The facsimile controller 122 operates to control each operation of the sections for achieving the facsimile function. The printer controller 123 operates to control each operation of the sections for achieving the printer function. The copying controller 124 operates to control each operation of the sections for achieving the copying function.

The data-information creation section 125 operates to create attribute information indicative of each content of image data (facsimile data) transmitted from an external facsimile machine and received by the facsimile communication section 18, image data (scan data) scanned by the scanner section 14 and image data (print data) transmitted from an external PC (Personal Computer) and received by the network communication section 13. Further, the data-information creation section 125 operates to create storage location information for specifying which of the complex machines 2, 3 has the HDD storing thereon each of the image data and for specifying a storage location of the image data in the HDD. The attribute information includes data name (document name), data creation date (when data is created), data storage date (when data is stored), data receiving date (when data is received), data preparer and data transmitter. The storage location information includes an address of data in the HDD, and an address of the complex machine having the HDD on a network, such as the LAN 5.

The table-data creation section 126 operates to create table data in which the attribute information and storage location information created by the data-information creation section 125 are correlated with one another. Further, the table-data creation section 126 operates to create table data in which the attribute information and storage location information transmitted from each of the complex or copy machines 2, 3. These table data created by the table-data creation section 126 are stored on the HDD 11.

The table-data retrieval section 127 operates to retrieve whether a retrieval keyword entered by a user using the manual operation section 17 to define target data is included in the attribute information of the table data stored in the HDD 11. At least one of data name (document name), data creation date, data storage date, data receiving date, data preparer and data transmitter which are included in the attribute information, and a given character, is used as the retrieval keyword.

When the table-data retrieval section 127 determines that the retrieval keyword is included in the attribute information, the connection-state determination section 128 operates to check whether the complex machine having the target data is currently connected to the network, in accordance with respective connection states of the complex machines 2, 3 stored in the HDD 11 and the storage location information corresponding to the attribute information of the target data. The HDD 11 stores information about respective connection states of the complex machines 2, 3, i.e. whether each of the complex machines 2, 3 is connected to the LAN 5 or to which of the complex machines 2, 3 the LAN 5 is connected.

The display control section 129 operates to display data read from the HDD 11 on the touch panel section 171. Further, when the connection-state determination section 128 determines that the complex machine having the target data is not currently connected to the network, the display control section 129 operates to display on the touch panel section 171 information indicating that the complex machine having the target data is not connected to the network.

The network communication section 13 operates to control exchange of various data with a client PC etc., connected thereto via the LAN 5, using a network interface (e.g. 10/100 Base-TX), for example, to receive print data transmitted from the client PC. The network communication section 13 also operates to control data exchange with each of the remaining complex machines or the complex machines 2, 3 connected thereto via the LAN 5. Specifically, the network communication section 13 operates to transmit attribute information indicative of a content of data stored on the HDD 11 and storage location information for specifying which of the complex machines 1, 2, 3 has the HDD storing the data thereon and for specifying a storage location of the data in the HDD, to each of the remaining complex machines, and to receive the attribute information and the storage location information transmitted from each of the remaining complex machines. Further, when the manual operation section 17 accepts an entry of a retrieval keyword, the network communication section 13 operates to make a request to each of the remaining complex machines for transmission of the attribute information and the storage location information. Furthermore, when the table-data retrieval section 127 determines that the retrieval keyword is included in the attribute information, the network communication section 13 operates to make a request to at least one of the remaining complex machines which has target data for transmission of the target data, in accordance with the storage location information corresponding to the attribute information of the target data, and to received the target data which is read in the remaining complex machine in response to the request and transmitted therefrom.

The scanner section 14 includes an exposure lamp 141 and a CCD (Charge-Coupled Device) 142 which constitute a scanner for sequentially scanning a document which are being fed. The scanner section 14 operates to irradiate a document with light from the exposure lamp 141, and receive resulting reflected light by the CCD 142 so as to scan an image from the document and output image data corresponding to the scanned image to the image processing section 15.

The image processing section 15 includes a correction section 151, an image modification section 152 and an image memory 153. The image processing section 15 operates to subject the scanned image data to a processing through the correction section 151 and the image modification section 152 according to need, and then store the processed image data on the image memory 153 and/or output the processed image data to the printer section 16, the facsimile communication section 18 or the network communication section 13. The correction section 151 operates to subject the scanned image data to a given correction processing, such as level correction or Y correction. The image modification section 152 operates to subject the scanned image data to various modification processings, such as compression/uncompression and enlargement/reduction.

The printer section 16 includes: a sheet feed section 161 comprising a sheet feed cassette for containing sheets therein and a sheet feed roller for taking the sheet out of the sheet feed cassette and feeding it to each section; an image forming section 162 comprising a photosensitive drum to be electrostatically charged uniformly, an exposure device for converting a modulated signal created based on image data of a document to laser light and output the laser light to form an electrostatic latent image on the photosensitive drum, and an image development device for supplying a given developer onto the photosensitive drum to form a toner image; a transfer section 163 comprising a transfer roller for transferring the toner image on the photosensitive drum to the fed sheet; and a fixing section 164 comprising a fixing roller for heating the transferred toner image to fix it on the sheet. The printer section 16 operates to print an image on a sheet using image data, such as document data scanned by the scanner section 14, print data transmitted from a client PC (Personal Computer) and received through the network communication section 13 via the LAN, or facsimile data transmitted from an external facsimile machine and received through the facsimile communication section 18. Specifically, the sheet feed section 161 feeds a sheet to the image forming section 162, and the image forming section 162 forms a toner image corresponding to the image data. Then, the transfer section 163 transfers the toner image onto the sheet, and the fixing section 164 fixes the toner image on the sheet to form an image.

The facsimile communication section 18 includes a coding/decoding section (not shown), a modulation/demodulation section (not shown) and a NCU (Network Control Unit) (not shown). The facsimile communication section 18 operates to transmit document image data scanned by the scanner section 14 to a facsimile machine over telephone lines, and receive image data transmitted from a facsimile machine etc. The coding/decoding section operates to subject image data to be transmitted, to compression/coding, and subject received image data to decompression/decoding. The modulation/demodulation section operates to modulate the compressed/coded image data to an audio signal, and demodulate received signal (audio signal) to image data. The NCU operates to control telephone-line connection with a facsimile machine as a transmitter or destination.

The HDD 11 operated to store thereon various data, such as image data scanned by the scanner section 14, image data transmitted from a client PC and received through the network communication section 13, image data received through the facsimile communication section 18 and output formats associated with these image data. The image data stored on the HDD 11 are not only used by the first complex machine itself, but also checked by a client PC through the network communication section 13 or transferred to a given folder of a client PC etc., according to need. Further, the HDD 11 operated to store thereon the table data created by the table-data creation section 126. Furthermore, the HDD 11 operated to store thereon respective current connection states of the remaining complex machines 2, 3.

Figure 3:
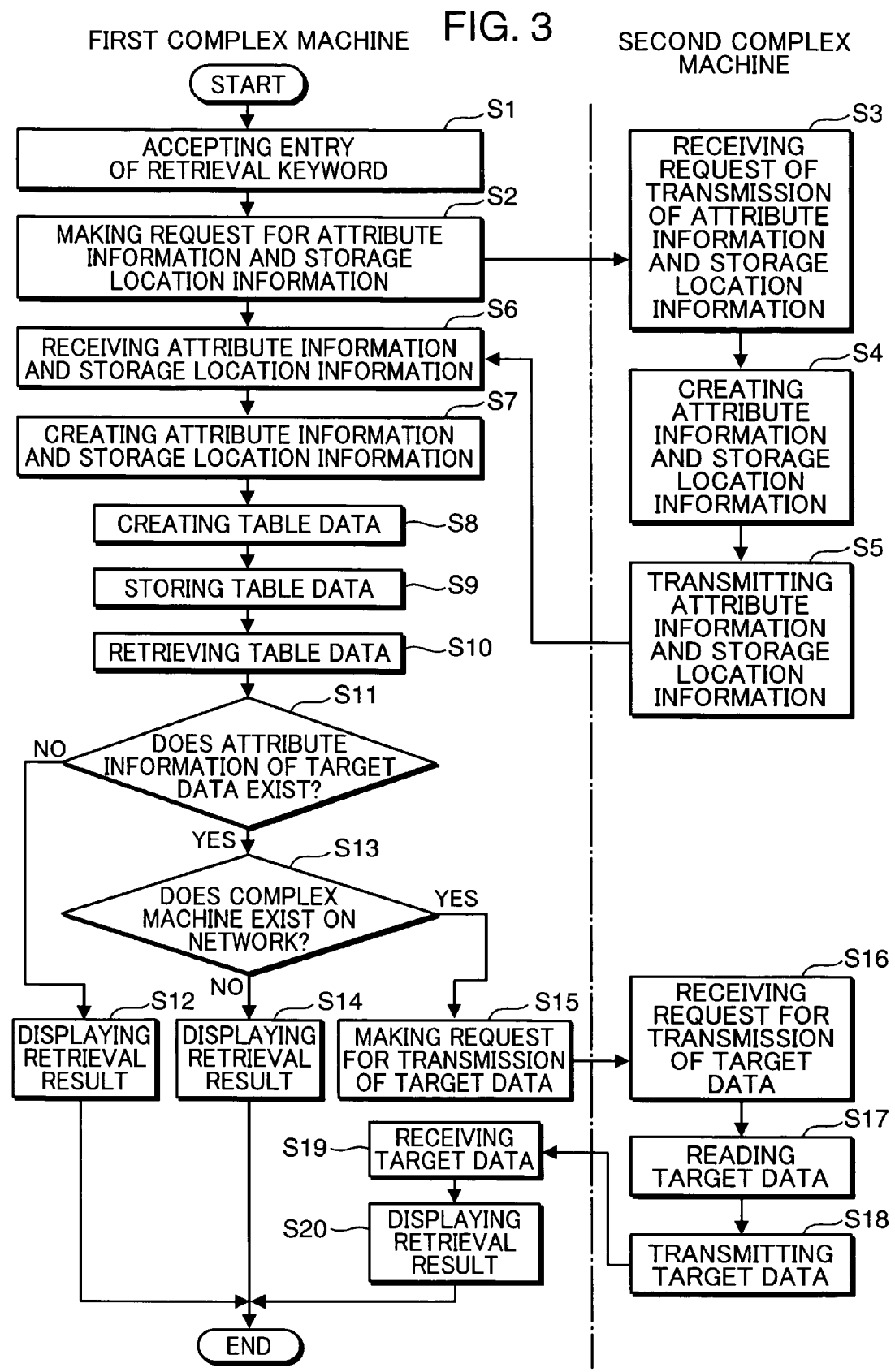
FIG. 3 is an explanatory flowchart of a data retrieval process in the first complex machine illustrated in FIG. 2.

An operation of the complex machine illustrated in FIG. 2 will be described below. FIG. 3 is an explanatory flowchart of a data retrieval process in the complex machine illustrated in FIG. 2. The following description will be made about a data retrieval process performed by the first complex machine 1 with reference to FIG. 3.

In Step S1, the manual operation section 17 accepts a retrieval keyword entered to define target data by a user. The user enters the retrieval keyword using the touch panel section 171 of the manual operation section 17. Then, in Step S2, the network communication section 13 makes a request to the second complex machine 2 for transmission of attribute information indicative of a content of data stored on the HDD 21 of the second complex machine 2, and storage location information for specifying the second complex machine 2 which has the HDD 21 storing the data thereon and for specifying a storage location of the data in the HDD 21. While this description is made based on FIG. 3 where the first complex machine 1 makes a request to the second complex machine 2 for transmission of attribute information and storage location information, the first complex machine 1 simultaneously makes a request to the third complex machine 3 for transmission of attribute information and storage location information.

Then, in Step S3, the network communication section 13 of the second complex machine 2 receives the request for transmission of attribute information and storage location information, which is transmitted from the first complex machine 1. Then, in Step S4, the data-information creation section 125 of the second complex machine 2 creates attribute information and storage location information of the data stored on the HDD 21 of the second complex machine 2. If a plurality of data are stored on the HDD 21 of the second complex machine 2, the data-information creation section 125 will create attribute information and storage location information on a data-by-data basis. Then, in Step S5, the network communication section 23 of the second complex machine 2 transmits the attribute information and storage location information created by the data-information creation section 125, to the first complex machine 1.

Then, in Step S6, the network communication section 13 of the first complex machine 1 receives the attribute information and the storage location information transmitted from the second complex machine 2. Then, in Step S7, the data-information creation section 125 of the first complex machine 1 creates attribute information and storage location information of data stored on the HDD 11 of the first complex machine 1. If a plurality of data are stored on the HDD 11 of the second complex machine 1, the data-information creation section 125 will create attribute information and storage location information on a data-by-data basis.

Then, in Step S8, the table data creation section 126 creates table data in which the attribute information and the storage location information created by the data-information creation section 125 of the first complex machine 1 and received through the network communication section 13 are correlated with one another. Then, in Step S9, the table data creation section 126 stores the created table data on the HDD 11.

Then, in Step S10, the table-data retrieval section 127 refers to the table data stored on the HDD 11 so as to retrieve attribute information including the retrieval keyword accepted by the manual operation section 17.

Then, in Step S11, the table-data retrieval section 127 checks whether any attribute information including the retrieval keyword accepted by the manual operation section 17 exists in the table data. When it is determined that there is no attribute information including the retrieval keyword (NO in Step S11), the process advances to Step S12. When it is determined that there is the attribute information including the retrieval keyword (YES in Step S11), the process advances to Step S13.

In Step S12 to be executed when it is determined that there is no attribute information including the retrieval keyword, the display control section 129 displays on the touch panel section 171 a retrieval result screen informing the user of the fact that there is no information including the retrieval keyword. This retrieval result screen is pre-stored on the HDD 11, and the display control section 129 reads out the retrieval result screen from the HDD 11 and displays it on the touch panel section 171.

In Step S13 to be executed when it is determined that there is the attribute information including the retrieval keyword, the connection-state determination section 128 refers to the data table stored in the HDD 11 so as to specify the complex machine having the target data relating to this attribute information, in accordance with the storage location information correlated with this attribute information. Further, the connection-state determination section 128 refers to the connection states stored in the HDD 11 so as to check whether the specified complex machine currently exists on the network. When it is determined that the specified complex machine does not currently exist on the network (NO in Step S13), the process advances to Step S14. When it is determined that the specified complex machine currently exists on the network (YES in Step S13), the process advances to Step S15.

In Step S14 to be executed when it is determined that the specified complex machine does not currently exist on the network, the display control section 129 displays on the touch panel section 171 a retrieval result screen informing the user of the fact that the target data exists in the complex machine which is not currently connected to the network. For example, given that the second complex machine 2 is not connected to the LAN 5, and the target data defined by the retrieval keyword is stored on the HDD 21 of the second complex machine 2, the display control section 129 displays on the touch panel section 171 information indicating that the target data is stored in the second complex machine 2 which is not currently connected to the LAN 5.

In Step S15 to be executed when it is determined that the specified complex machine currently exists on the network, the network communication section 13 makes a request to the specified complex machine for transmission of the target data. The following description will be made with reference to FIG. 3 on the assumption that the specified complex machine is the second complex machine 2.

Then, in Step S16, the network communication section 23 of the second complex machine 2 receives the target-data transmission request transmitted from the first complex machine 1. Then, in Step S17, the control section 22 of the second complex machine 2 reads out the requested target data from the HDD 21. The target-data transmission request transmitted from the first complex machine 1 includes the storage location information of the target data in the HDD 21 to allow the control section 22 to read out the target data from the HDD 21 in accordance with this storage location information. Then, in Step S18, the network communication section 23 of the second complex machine 2 transmits the target data read by the control section 22 to the first complex machine 1.

Then, in Step S19, the network communication section 13 of the first complex machine 1 receives the target data transmitted from the second complex machine 2. Then, in Step S20, the display control section 129 displays on the touch panel section 171 a retrieval result screen informing the user of the target data received by the network communication section 13. While the retrieval result screen in this embodiment is designed to display a content of image data scanned by the scanner section 14, the present invention is not limited to this manner, but only a data name of the target data may be displayed. Further, if a plurality of data are matched with the retrieval keyword, the entire contents of the data may be displayed or only respective data names of the data may be displayed. In this case, it may be designed to allow a user to select one or more of the displayed data names, and acquire contents only of the selected data to display the acquired contents.

As above, the HDD 21 of the second complex machine 2 stores data thereon, and the network communication section 13 of the first complex machine 1 makes a request to the second complex machine 2 for transmission of attribute information indicative of a content of the data stored on the HDD 21, and storage location information for specifying the second complex machine 2 which has the HDD 21 storing the data thereon and for specifying a storage location of the data in the HDD 21. Then, the network communication section 23 of the second complex machine 2 receives the request from the first complex machine 1, and transmits the requested attribute information and storage location information to the first complex machine 1. The network communication section 13 of the first complex machine 1 receives the attribute information and storage location information transmitted from the second complex machine 2. Then, the table-data creation section 126 creates table data in which the attribute information and storage location information received by the network communication section 13 are correlated with one another, and the HDD 11 stores thereon the table data created by the table-data creation section 126.

Thus, the attribute information indicative of a content of data stored on the HDD of each of the plurality of complex machines connected to the network, and the storage location of the data in the HDD, are stored on the HDD of a certain one of the plurality of complex machines in the form of the table data. This makes it possible to manage in an integrated manner data stored in the plurality of complex machines. In addition, information to be provided to a user can be virtually formed as a single information source without the need for designating which of the plurality of complex machines has the HDD storing intended data thereon.

Further, when the manual operation section 17 of the first complex machine 1 accepts a retrieval keyword entered to define target data by a user, the network communication section 13 makes a request to the second complex machine 2 for transmission of attribute information and storage location information, and the network communication section 23 of the second complex machine 2 transmits the attribute information and storage location information requested by the network communication section 13 of the first complex machine 1.

Thus, in response to the entry of the retrieval keyword by the user, the attribute information and storage location information of the data in the remaining complex machines can be acquired from the remaining complex machines to reliably store latest information in the form of the table data.

While the request for transmission of attribute information and storage location information in this embodiment is issued in response to an entry of a retrieval keyword by a user, the present invention is not limited to this manner, but the request for transmission of attribute information and storage location information may be issued to the remaining complex machines at given time-intervals, for example, once every hour.

In the above embodiment, the table-data retrieval section 127 of the first complex machine 1 checks whether a retrieval keyword accepted by the manual operation section 17 is includes in the attribute information in the table data stored on the HDD 11. Then, when the table-data retrieval section 127 determines that the retrieval keyword is includes in the attribute information, the network communication section 13 makes a request to the second complex machine 2 having the target data for transmutation of the target data, in accordance with the storage location information corresponding to the attribute information of the target data. Then, the network communication section 23 of the second complex machine 2 reads out the target data requested by the network communication section 13 of the first complex machine 1, and transmits the readout target data to the first complex machine 1. The network communication section 13 of the first complex machine 1 receives the target data transmitted from the network communication section 23 of the second complex machine 2, and the display control section 129 displays on the touch panel section 171 the target data received by the network communication section 13.

In this manner, through the retrieval of whether the retrieval keyword is included in the attribute information in the table data, when it is determined that the retrieval keyword is included in the attribute information, the remaining complex machine having the target data is specified in accordance with the storage location information corresponding to the attribute information of the target data, and the target data is acquired from the specified remaining complex machine.

Thus, data stored on the HDDs of all of the complex machines connected to the network can be retrieved without specifying the HDD storing the target data thereon.

In the above embodiment, the HDD 11 of the first complex machine 1 stores respective connection states of the remaining complex machines which are acquired through the network. When the table-data retrieval section 127 determines that the retrieval keyword is includes in the attribute information, the connection-state determination section 128 checks whether the second complex machine 2 having the target data is currently connected to the network, in accordance with the connection states stored on the HDD 11, and the storage location information corresponding to the attribute information of the target data. Then, when the connection-state determination section 128 determines that the second complex machine 2 having the target data is currently connected to the network, the network communication section 13 makes a request to the second complex machine 2 having the target data for transmission of the target data, in accordance with the storage location information corresponding to the attribute information of the target data. If the connection-state determination section 128 determines that the second complex machine 2 having the target data is not currently connected to the network, the display control section 129 will display on the touch panel section 171 information indicating that the second complex machine 2 having the target data is not connected to the network.

Thus, the respective connection states of the remaining complex machines acquired through the network are stored on the HDD, and, when it is determined that the retrieval keyword is includes in the attribute information, it is checked whether the remaining complex machine having the target data is currently connected to the network, in accordance with the connection states and the storage location information corresponding to the attribute information of the target data. That is, the retrieval can be performed to cover data stored on the HDD which is not currently connected to the network but previously connected to the network.

Figure 4:
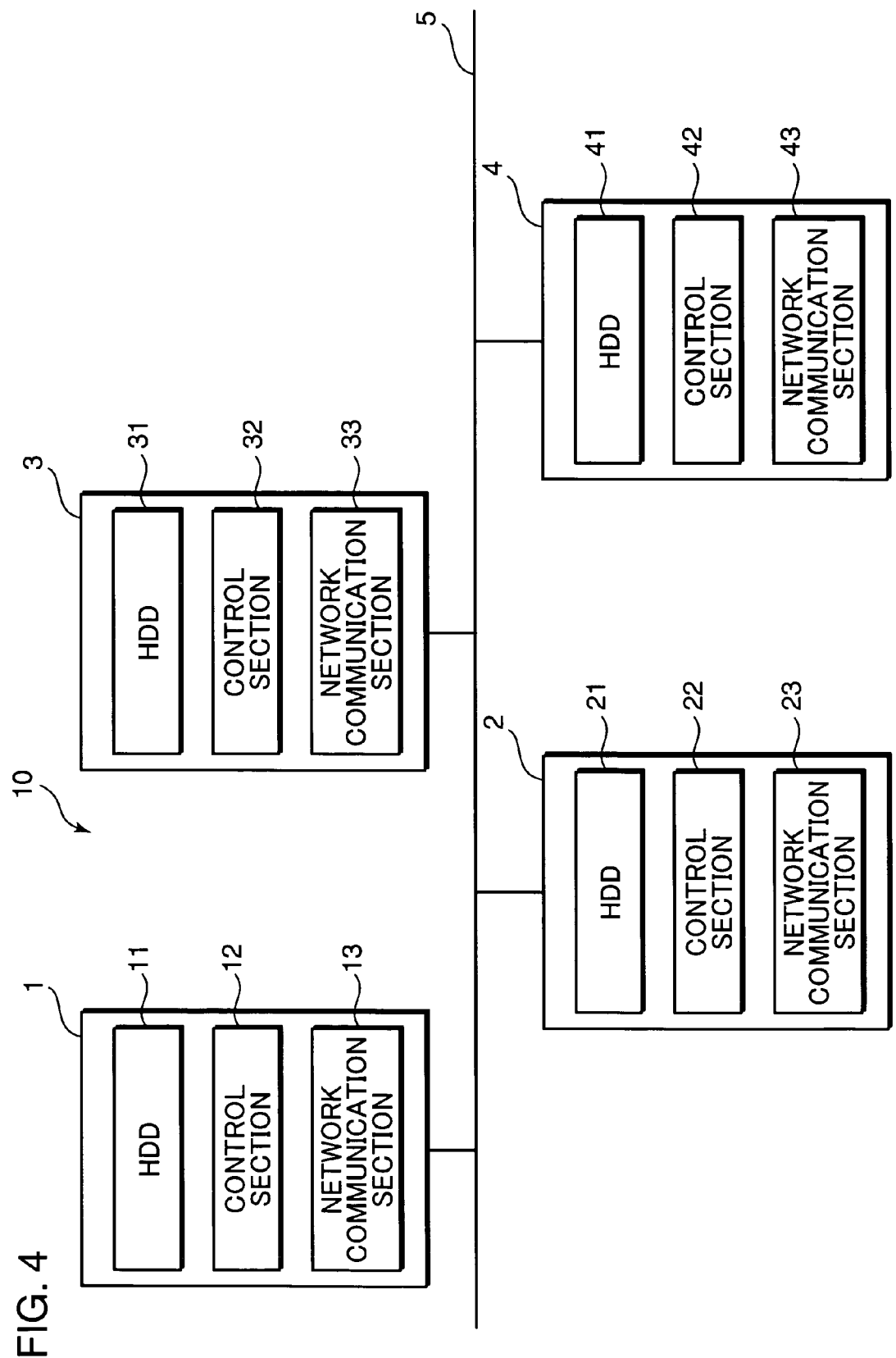
FIG. 4 is a block diagram showing the configuration of the data management system, wherein a fourth complex machine is newly connected to a network.

An operation to be performed when a new complex machine is connected to the network will be described below. FIG. 4 is a block diagram showing the configuration of the data management system in the state after a fourth complex machine 4 is newly connected to the network. The fourth complex machine 4 comprises a HDD 41, a control section 42, and a network communication section 43. The HDD 41 as one example of data storage means operates to store data thereon, and the control section 42 operates to monitor and generally control the HDD 41. The network communication section 43 operates to perform exchange of data with each of the machines 1, 2, 3. The fourth complex machine 4 has the same configuration as that of the first complex machine 1 illustrated in FIG. 2, and its description will be omitted.

As shown in FIG. 4, when the fourth complex machine 4 is newly connected to the LAN 5 in the state after the first to third complex machines 1, 2, 3 have already been connected to the LAN 5, the fourth complex machine 4 is operable to acquire the table data stored on the HDD of one of the plurality of previously-connected complex machines, for example, the first complex machine 1, so as to reduce a time required for creating table data.

Figure 5:
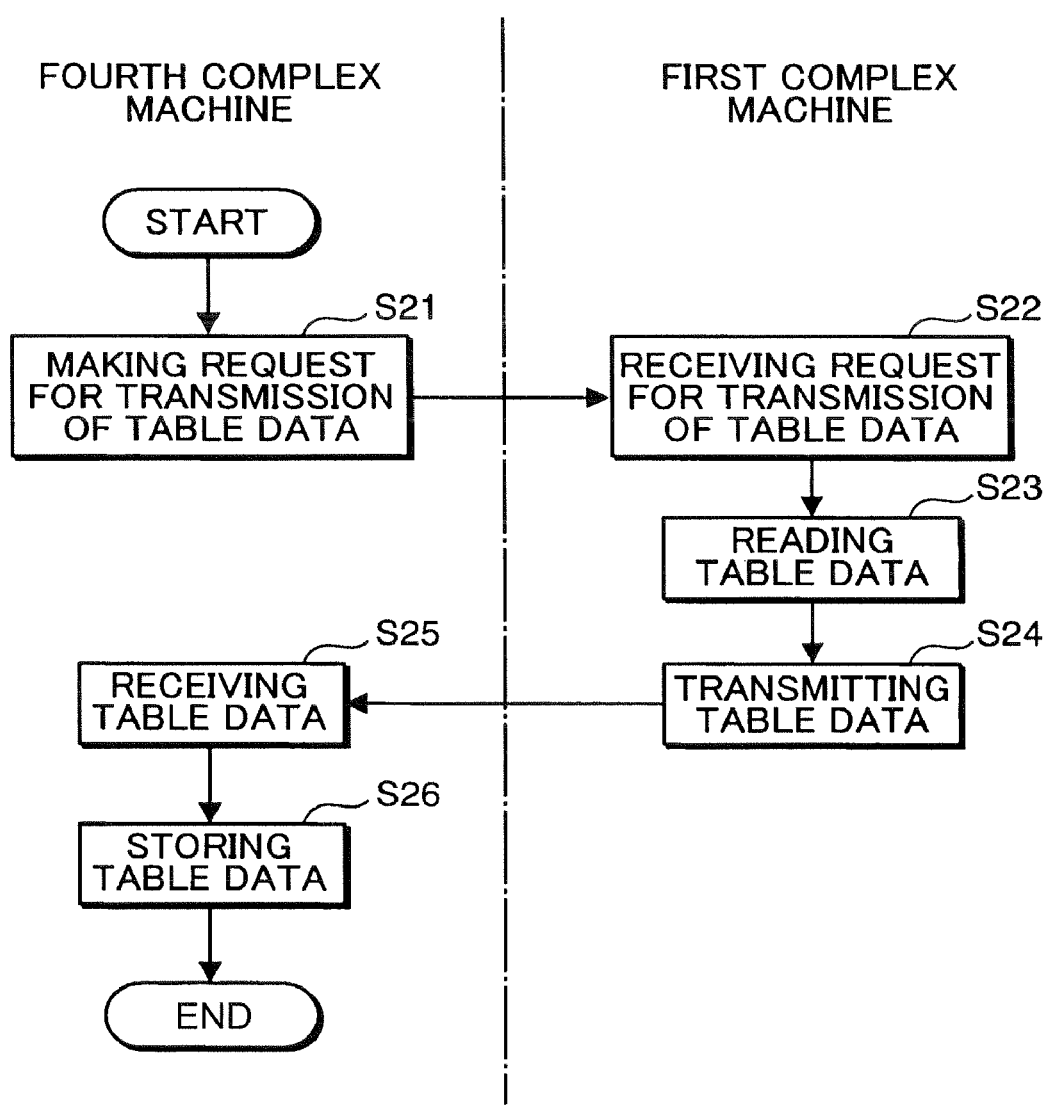
FIG. 5 is an explanatory flowchart of respective operations of the fourth complex machine newly connected to the network and the first complex machine.

FIG. 5 is an explanatory flowchart of respective operations of the fourth complex machine 4 newly connected to the network and the first complex machine 1.

In Step S21, the network communication section 43 of the fourth complex machine 4 makes a request to the first complex machine 1 for transmission of table data. While the fourth complex machine 4 in this embodiment makes a request to first complex machine 1 for transmission of table data, the present invention is not limited to this manner, but the request for transmission of table data may be issued to either one of the second and third complex machines 2, 3.

Then, in Step S22, the network communication section 13 of the first complex machine 1 receives the table-data transmission request transmitted from the fourth complex machine 4. Then, in Step S23, the control section 12 of the first complex machine 1 reads out the table data from the HDD 11. Then, in Step S24, the network communication section 13 of the first complex machine 1 transmits the table data read by the control section 12 to the fourth complex machine 4.

Then, in Step S25, the network communication section 43 of the fourth complex machine 4 receives the table data transmitted from the first complex machine 1. Then, in Step S26, the control section 42 of the fourth complex machine 4 stores the table data received by the network communication section 43 on the HDD 41.

While the fourth complex machine 4 newly connected to the network in this embodiment is designed to acquire the table data from the first complex machine 1 and store the acquired table data on the HDD 41, the present invention is not limited to this manner, but the fourth complex machine 4 newly connected to the network may be designed to acquire attribute information and storage location information from either one of the complex machines 1, 2, 3 which have been previously connected to the network, so as to create table data in accordance with the acquired attribute information and storage location information and store the created table data on the HDD 41.

In this manner, when the fourth complex machine 4 is newly connected to the network, the network communication section 43 of the newly-connected complex machine 4 makes a request to the previously-connected complex machine 1 for transmission of table data. Then, the network communication section 13 of the previously-connected complex machine 1 reads out the table data requested by the network communication section 43 of the newly-connected complex machine 4, from the HDD 11, and transmits the readout table data to the newly-connected complex machine 4. The network communication section 43 of the newly-connected complex machine 4 receives the table data transmitted from the network communication section 13 of the previously-connected complex machine 1, and stores the table data received by the network communication section 43, on the HDD 41 of the newly-connected complex machine 4.

Thus, when a complex machine is newly connected to the network, table data is acquired from the previously-connected complex machine. This allows the newly-connected complex machine to eliminate the need for creating table so as to reduce a time required for creating table data.

The above embodiment primarily includes the following features of the present invention.

In a data management system comprising a plurality of image forming apparatuses connected to each other via a network, each of the plurality of image forming apparatuses includes data storage means for storing data thereon, and communication means for transmitting and receiving data. The communication means of a certain one of the plurality of image forming apparatuses is operable to make a request to a remaining one or more of the plurality of image forming apparatuses for transmission of attribute information indicative of a content of data stored on the data storage means thereof, and storage location information for specifying which of the plurality of image forming apparatuses has the data storage means storing the data thereon and for specifying a storage location of the data in the data storage means, and the communication means of each of the remaining image forming apparatuses is operable to receive the request from the certain image forming apparatus, and then transmit the attribute information and the storage location information thereof to the certain image forming apparatus. Then, the communication means of the certain image forming apparatus is operable to receive the attribute information and the storage location information transmitted from each of the remaining image forming apparatuses. Further, the certain image forming apparatus includes table-data creation means for creating table data in which the attribute information and the storage location information transmitted from each of the remaining image forming apparatuses are correlated with one another, and table-data storage means for storing thereon the table data created by the table-data creation means.

In the above data management system, the communication means of the certain one of the plurality of image forming apparatuses connected to each other via the network makes a request to each of the remaining image forming apparatuses for transmission of attribute information indicative of a content of data stored on the data storage means thereof, and storage location information for specifying which of the plurality of image forming apparatuses has the data storage means storing the data thereon and for specifying a storage location of the data in the data storage means. Then, the communication means of each of the remaining image forming apparatuses receives the request from the certain image forming apparatus and transmits the requested attribute information and storage location information to the certain image forming apparatus. The communication means of the certain image forming apparatus receives the attribute information and the storage location information transmitted from each of the remaining image forming apparatuses. Then, the table-data creation means creates table data in which the attribute information and the storage location information transmitted from each of the remaining image forming apparatuses are correlated with one another, and the table-data storage means stores the table data created by the table-data creation means.

In this manner, the attribute information indicative of a content of data stored on the data storage means of each of the image forming apparatuses connected to the network, and the storage location of the data in the data storage means, are stored in the form of the table data. This makes it possible to manage in an integrated manner data stored in a plurality of image forming apparatuses. In addition, information to be provided to a user can be virtually formed as a single information source without the need for designating which of the plurality of image forming apparatuses has the data storage means storing intended data thereon.

In a preferred form of the above data management system, the certain image forming apparatus further includes entry acceptance means for accepting a retrieval keyword entered to define target data by a user. In this case, the communication means of the certain image forming apparatus is operable, when the entry acceptance means accepts an entry of a retrieval keyword, to make a request to each of the remaining image forming apparatuses for transmission of the attribute information and the storage location information, and the communication means of each of the remaining image forming apparatuses is operable to transmit the attribute information and the storage location information requested by the communication of the certain image forming apparatus.

As above, when the entry acceptance means of the certain image forming apparatus accepts a retrieval keyword entered to define target data by a user, the communication means of the certain image forming apparatus makes a request to each of the remaining image forming apparatuses for transmission of attribute information and storage location information, and the communication means of each of the remaining image forming apparatuses transmits the attribute information and storage location information requested by the communication means of the certain image forming apparatus.

Thus, in response to the entry of the retrieval keyword by the user, the attribute information and storage location information of the data in the remaining image forming apparatuses can be acquired from the remaining image forming apparatuses to reliably store latest information in the form of the table data.

In a preferred form of the above data management system, the certain image forming apparatus further includes display means for displaying a given image, and retrieval means for retrieving whether the retrieval keyword accepted by the entry acceptance means is includes in the attribute information of the table data stored on the table-data storage means. In this case, the communication means of the certain image forming apparatus is operable, when the retrieval means determines that the retrieval keyword is included in the attribute information, to make a request to at least one of the remaining image forming apparatuses which has the target data for transmission of the target data, in accordance with the storage location information corresponding to the attribute information, and the communication means of the remaining image forming apparatus is operable to read out the target data requested by the communication means of the certain image forming apparatus and then transmit the readout target data to the certain image forming apparatus. Then, the communication means of the certain image forming apparatus is operable to receive the target data transmitted by the communication means of the remaining image forming apparatus, and the display means of the certain image forming apparatus is operable to display the target data received by the communication means thereof.

As above, the retrieval means of the certain image forming apparatus checks whether a retrieval keyword accepted by the entry acceptance means is includes in the attribute information in the table data stored on the table-data storing means. Then, when the retrieval means determines that the retrieval keyword is includes in the attribute information, the communication means makes a request to the remaining image forming apparatus having the target data for transmutation of the target data, in accordance with the storage location information corresponding to the attribute information of the target data. Then, the communication means of the remaining image forming apparatus reads out the target data requested by the communication means of the certain image forming apparatus, and transmits the readout target data to the certain image forming apparatus. The communication means of the certain image forming apparatus receives the target data transmitted from the communication means of the remaining image forming apparatus, and the display means displays the target data received by the communication means.

In this manner, through the retrieval of whether the retrieval keyword is included in the attribute information in the table data, when it is determined that the retrieval keyword is included in the attribute information, the remaining image forming apparatus having the target data is specified in accordance with the storage location information corresponding to the attribute information of the target data, and the target data is acquired from the specified remaining image forming apparatus. Thus, data stored on the data storage means all of the image forming apparatuses connected to the network can be retrieved without specifying the data storage means storing the target data thereon.

In a preferred form of the above data management system, the certain image forming apparatus further includes connection-state storage means for storing thereon respective connection states of the remaining image forming apparatuses, and determination means operable, when the retrieval means determines that the retrieval keyword is included in the attribute information, to check whether the remaining image forming apparatus having the target data is currently connected to the network, in accordance with the connection states stored on the connection-state storage means, and the storage location information corresponding to the attribute information. In this case, the communication means of the certain image forming apparatus is operable, when the determination means determines that the remaining image forming apparatus having the target data is currently connected to the network, to make a request to the remaining image forming apparatus for transmission of the target data, in accordance with the storage location information corresponding to the attribute information, and the display means of the certain image forming apparatus is operable, when the determination means determines that the remaining image forming apparatus having the target data is not currently connected to the network, to display information indicating that the remaining image forming apparatus having the target data is not connected to the network.

As above, the connection-state storage means of the certain image forming apparatus stores respective connection states of the remaining image forming apparatuses which are acquired through the network. When the retrieval means determines that the retrieval keyword is includes in the attribute information, the determination means checks whether the remaining image forming apparatus having the target data is currently connected to the network, in accordance with the connection states stored on the connection-state storage means, and the storage location information corresponding to the attribute information of the target data. Then, when the determination means determines that the remaining image forming apparatus having the target data is currently connected to the network, the communication makes a request to the remaining image forming apparatus having the target data for transmission of the target data, in accordance with the storage location information corresponding to the attribute information of the target data. If the determination means determines that the remaining image forming apparatus having the target data is not currently connected to the network, the display means will display information indicating that the remaining image forming apparatus having the target data is not connected to the network.

Thus, the respective connection states of the remaining image forming apparatuses acquired through the network are stored, and, when it is determined that the retrieval keyword is includes in the attribute information, it is checked whether the remaining image forming apparatus having the target data is currently connected to the network, in accordance with the connection states and the storage location information corresponding to the attribute information of the target data. That is, the retrieval can be performed to cover data stored on the data storage means of the image forming apparatus which is not currently connected to the network but previously connected to the network.

In a preferred form of the above data management system, when the plurality of image forming apparatuses include an image forming apparatus newly connected to the network, and the image forming apparatuses previously connected to the network, the communication means of the newly-connected image forming apparatus is operable to make a request to the previously-connected image forming apparatuses for transmission of the table data thereof, and the communication means of the previously-connected image forming apparatuses are operable to read out the table data requested by the communication means of the newly-connected image forming apparatus from the table-data storage means, and transmit the readout table data to the newly-connected image forming apparatus. Then, the communication means of the newly-connected image forming apparatus is operable to receive the table data transmitted by the communication means of the previously-connected image forming apparatus, and the table-data storage means of the newly-connected image forming apparatus is operable to store thereon the table data received by the communication means thereof.

As above, when an image forming apparatus is newly connected to the network, the communication means of the newly-connected image forming apparatus makes a request to the previously-connected image forming apparatus for transmission of table data. Then, the communication means of the previously-connected image forming apparatus reads out the table data requested by the communication means of the newly-connected image forming apparatus, from the table-data storage means, and transmits the readout table data to the newly-connected image forming apparatus. The communication means of the newly-connected image forming apparatus receives the table data transmitted from the communication means of the previously-connected image forming apparatus, and stores the table data received by the communication means, on the table-data storage means of the newly-connected image forming apparatus.

Thus, when an image forming apparatus is newly connected to the network, table data is acquired from the previously-connected image forming apparatus. This allows the newly-connected image forming apparatus to eliminate the need for creating table so as to reduce a time required for creating table data.

An image forming apparatus for use in such a manner that a plural number of the image forming apparatuses are connected to each other via a network, comprises data storage means for storing data thereon, transmission means for transmitting to a remaining one or more of the plurality of image forming apparatuses attribute information indicative of a content of data stored on the data storage means, and storage location information for specifying which of the plurality of image forming apparatuses has the data storage means storing the data thereon and for specifying a storage location of the data in the data storage means, receiving means for receiving the attribute information and the storage location information transmitted from each of the remaining image forming apparatuses, table-data creation means for creating table data in which the attribute information and the storage location information received by the receiving means are correlated with one another, and table-data storage means for storing thereon the table data created by the table-data creation means.

In the above image forming apparatus, the data storage means stores data thereon, and the transmission means transmits to each of the remaining image forming apparatuses attribute information indicative of a content of data stored on the data storage means, and storage location information for specifying which of the plurality of image forming apparatuses has the data storage means storing the data thereon and for specifying a storage location of the data in the data storage means. Further, the receiving means receives the attribute information and the storage location information transmitted from each of the remaining image forming apparatuses. Then, the table-data creation means creates table data in which the attribute information and the storage location information received by the receiving means are correlated with one another, and the table-data storage means stores thereon the table data created by the table-data creation means.

In this manner, the attribute information indicative of a content of data stored on the data storage means of each of the image forming apparatuses connected to the network, and the storage location of the data in the data storage means, are stored in the form of the table data. This makes it possible to manage in an integrated manner data stored in a plurality of image forming apparatuses. In addition, information to be provided to a user can be virtually formed as a single information source without the need for designating which of the plurality of image forming apparatuses has the data storage means storing intended data thereon.

This application is based on patent application No. 2004-345968 filed in Japan, the contents of which are hereby incorporated by references.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. A data management system comprising a plurality of image forming apparatuses connected to each other via a network, each of said plurality of image forming apparatuses including data storage means for storing data thereon, a control section for reading attribute information and storage location information of data stored on the data storage means and communication means for transmitting and receiving data, wherein:

the communication means of a certain one of said plurality of image forming apparatuses is operable to make a request to a remaining one or more of said plurality of image forming apparatuses for transmission of attribute information indicative of a content of data stored on the data storage means of each of said remaining image forming apparatuses, and storage location information for specifying which of said plurality of image forming apparatuses has said data storage means storing said data thereon and for specifying a storage location of said data in said data storage means;

the communication means of each of said remaining image forming apparatuses is operable to receive said request from said certain image forming apparatus, and then transmit the attribute information and the storage location information of each of said remaining image forming apparatuses to said certain image forming apparatus; and said communication means of said certain image forming apparatus is operable to receive said attribute information and said storage location information transmitted from each of said remaining image forming apparatuses, wherein said certain image forming apparatus further includes:

table-data creation means for creating table data in which said attribute information and said storage location information transmitted from each of said remaining image forming apparatuses are correlated with one another;

table-data storage means for storing thereon said table data created by said table-data creation means;

entry acceptance means for accepting a retrieval keyword entered to define target data by a user;

display means for displaying a given image; and retrieval means for retrieving whether said retrieval keyword accepted by said entry acceptance means is included in the attribute information of said table data stored on said table-data storage means;

wherein said communication means of said certain image forming apparatus is operable, when said entry acceptance means accepts an entry of a retrieval keyword, to make a request to each of said remaining image forming apparatuses for transmission of said attribute information and said storage location information;

said communication means of each of said remaining image forming apparatuses is operable to transmit said attribute information and said storage location information requested by said communication of said certain image forming apparatus;

said communication means of said certain image forming apparatus is operable, when said retrieval means determines that said retrieval keyword is included in said attribute information, to make a request to at least one of said remaining image forming apparatuses which has said target data for transmission of said target data, in accordance with the storage location information corresponding to said attribute information;

said control section of said remaining image forming apparatus is operable to read out the target data requested by said communication means of said certain image forming apparatus and then transmits said readout target data to said certain image forming apparatus by said communication means of said remaining image forming apparatus;

said communication means of said certain image forming apparatus is operable to receive the target data transmitted by said communication means of said remaining image forming apparatus; and said display means of said certain image forming apparatus is operable to display the target data received by said communication means of said certain image forming apparatus.

2. The data management system as defined in claim 1, wherein said certain image forming apparatus further includes:

connection-state storage means for storing thereon respective connection states of said remaining image forming apparatuses; and determination means operable, when said retrieval means determines that said retrieval keyword is included in said attribute information, to check whether the remaining image forming apparatus having said target data is currently connected to said network, in accordance with said connection states stored on said connection-state storage means, and the storage location information corresponding to said attribute information, wherein:

said communication means of said certain image forming apparatus is operable, when said determination means determines that said remaining image forming apparatus having said target data is currently connected to said network, to make a request to said remaining image forming apparatus for transmission of said target data, in accordance with the storage location information corresponding to said attribute information; and said display means of said certain image forming apparatus is operable, when said determination means determines that said remaining image forming apparatus having said target data is not currently connected to said network, to display information indicating that said remaining image forming apparatus having said target data is not connected to said network.

3. The data management system as defined in claim 1, wherein said plurality of image forming apparatuses include an image forming apparatus newly connected to said network, and the image forming apparatuses previously connected to said network, wherein:

the communication means of said newly-connected image forming apparatus is operable to make a request to said previously-connected image forming apparatuses for transmission of the table data of said previously-connected image forming apparatuses;

the communication means of said previously-connected image forming apparatuses are operable to read out the table data requested by said communication means of said newly-connected image forming apparatus from said table-data storage means, and transmit said readout table data to said newly-connected image forming apparatus;

said communication means of said newly-connected image forming apparatus is operable to receive the table data transmitted by said communication means of said previously-connected image forming apparatus; and the table-data storage means of said newly-connected image forming apparatus is operable to store thereon the table data received by said communication means of said newly-connected image forming apparatus.

4. An image forming apparatus for use in such a manner that a plural number of said image forming apparatuses are connected to each other via a network, comprising:

data storage means for storing data thereon;

a control section for reading attribute information and storage location information of data stored on the data storage means transmission means for transmitting to a remaining one or more of said plurality of image forming apparatuses attribute information indicative of a content of data stored on said data storage means, and storage location information for specifying which of said plurality of image forming apparatuses has said data storage means storing said data thereon and for specifying a storage location of said data in said data storage means;

receiving means for receiving the attribute information and the storage location information transmitted from each of said remaining image forming apparatuses;

table-data creation means for creating table data in which said attribute information and said storage location information received by said receiving means are correlated with one another;

table-data storage means for storing thereon said table data created by said table-data creation means;

entry acceptance means for accepting a retrieval keyword entered to define target data by a user;

display means for displaying a given image; and retrieval means for retrieving whether said retrieval keyword accepted by said entry acceptance means is included in the attribute information of said table data stored on said table-data storage means;

wherein said transmission means is operable, when said entry acceptance means accepts an entry of a retrieval keyword, to make a request to each of said remaining image forming apparatuses for transmission of said attribute information and said storage location information;

said transmission means is operable, when said retrieval means determines that said retrieval keyword is included in said attribute information, to make a request to at least one of said remaining image forming apparatuses which has said target data for transmission of said target data, in accordance with the storage location information corresponding to said attribute information;

said receiving means is operable to receive the target data transmitted by said remaining image forming apparatus; and said display means is operable to display the target data received by said communication means.

* * * * *